H. Burden,
Rolling Puddlers Balls,
Nº 6,792.      Patented Oct. 16, 1849.

UNITED STATES PATENT OFFICE.

HENRY BURDEN, OF TROY, NEW YORK.

MACHINERY FOR DRAWING OUT AND COMPRESSING HEATED IRON.

Specification of Letters Patent No. 6,792, dated October 16, 1849.

*To all whom it may concern:*

Be it known that I, HENRY BURDEN, of Troy, in the county of Rensselaer and State of New York, have invented new and useful Improvements in the Manufacture of Iron and in Machinery for Producing the Same, and that the following is a full, clear, and exact description of the principle or character of my invention, which distinguishes it from all other things before known, and of the manner of making, constructing, and using the same, reference being had to the accompanying drawings, making part of this specification, in which—

Figure 6:
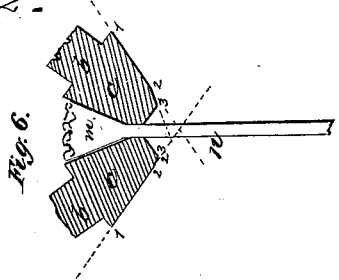
Figure 7:
Figure 4:
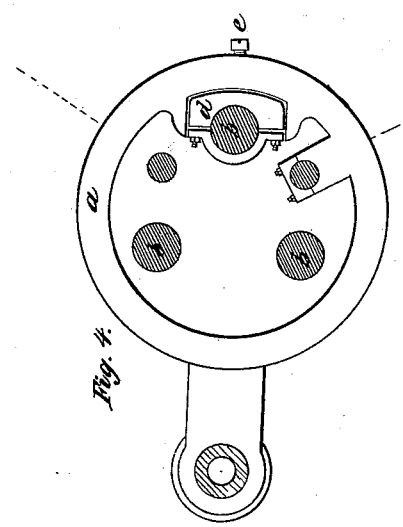
Figure 5:
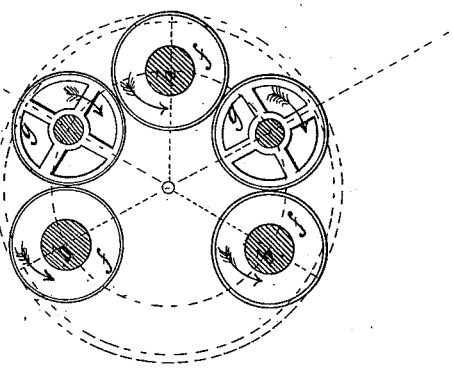
Figure 1:
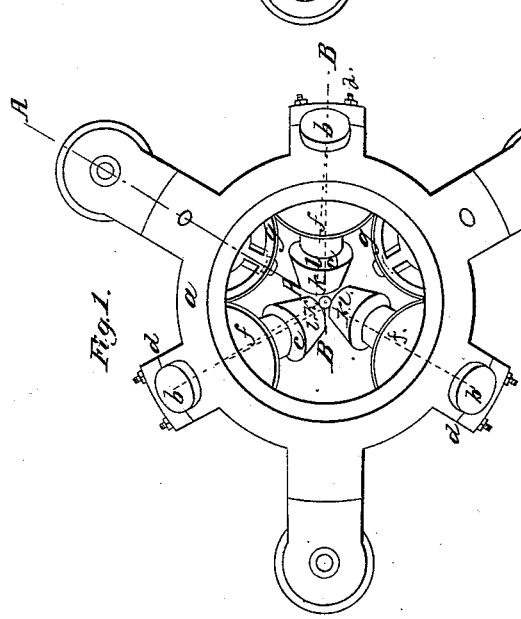
Figure 3:
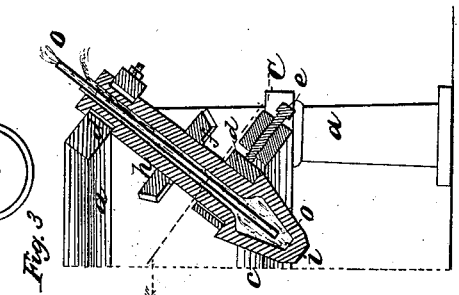
Figure 2:
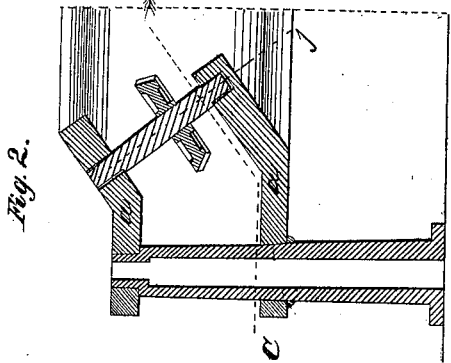

Figure 1, is a plan of the machine, Figs. 2 and 3, vertical sections taken at the lines (A, A,) and (B, B,) of Fig. 1, Fig. 4, a horizontal section of the frame work, taken at the line (C, C,) of Figs. 2 and 3, and representing only one of the adjustable boxes of the rollers and one of the boxes for the intermediate wheels, the others being made in like manner, Fig. 5, is a plan of the gear wheels, Fig. 6, a vertical section through the axis of two of the rollers with a bar of iron in the act of being rolled, and Fig. 7 an inverted view of the ends of the rollers and the bar of iron between them.

In the several sections the circles which would be represented by ellipses are drawn in circles. The same letters indicate like parts in all the figures.

The principle or character of my invention which distinguishes it from all other things before known, for the manufacture of iron consists in working puddlers' balls or other highly heated masses of iron and reducing them into blooms or bars, by rolling and squeezing them from one end toward the other and by the motion or motions of surfaces at right angles or nearly so to the axes of the bar or bloom to be produced, whereby the mass is gradually reduced and elongated from one end and the bar produced and finished. And the principle or character of the machinery which I have invented for the purpose of working iron after my improved method consists in rolling and squeezing lumps or balls of iron between surfaces inclined to the axis of the mass of iron to be worked so that by the motion of one or more of these squeezing surfaces at right angles or nearly so to the axes of the bar to be produced, the mass of iron shall be thereby gradually squeezed and reduced and carried toward and out of the space between the said inclined surfaces where they are nearest together the mass of iron being there delivered in a finished form. By this means the rolling action on the iron is at right angles or nearly so to the axes of the bar and to the line in which it is elongated, and hence the surfaces which roll or squeeze the metal may be made to move much faster than the motion of the mass in the direction of its elongation.

In the accompanying drawings (*a*) represents the frame work of the machine in which are hung the shafts (*b, b, b,*) of three rolls (*c, c, c,*) arranged at equal distances around a common axis. Each shaft has two journals running in boxes (*d, d,*) the lower one so mounted in the frame that by means of set screws (*e*) the axes of the rollers can be adjusted in a radial direction from or toward the central line around which they are arranged. The rolls are frustums of cones from the lines 1 to 2, and from 2 to 3, which is the extremity of the rolls—they are in the form of the frustum of a flatter or more obtuse cone, so that in the plane of the radii of the common center the latter part will be parallel with the common axes around which the three rolls are arranged.

There is a cog wheel (*f*) on the shaft of each of the rolls the three being of equal diameter, and these three are caused to rotate in the same direction by means of two intermediate cog wheels (*g, g*). The driving power should be applied to the shaft (*h*) of one of the rolls in any desired manner, although it may be applied to the shaft of one of the intermediate wheels. The dotted lines (*i, j,*) in sections Figs. 2 and 3, represent the inclination of the axis of the rolls and the intermediate wheels from the axes around which they are arranged, and the dotted lines (*k, k, k,*) in Fig. 1, represent vertical planes radiating from this common axis, and the dotted lines (*l l l*), the lines of the axis of the three rolls which are slightly inclined thereto.

When the rolls are set in motion a loop or ball of iron (*m*) in a highly heated state, is dropped in between them at their upper end, the frame work being left open above for that purpose, and the slight inclination of the axis of the three rolls from the vertical plane, as indicated by the dotted lines (*l, l, l,*), causes the rolls gradually to carry down the ball of iron between them toward their lower end where they are nearer together by reason of the inclination of their axis from the vertical line being greater than the lines of the cones. By this means not only is the mass of iron gradually drawn down, in the direction of the common axis around which the rolls are arranged, but by the action of the rotating surface of the rolls in a line nearly at right angles to this common center the iron is rotated on its axis and squeezed in a spiral direction and the mass gradually elongated and carried out at the bottom in a round bar (n) as respresented in Fig. 5, of a diameter equal to the space between the lower end of the three rolls, where the cones are so flat as to reduce the bar to a cylindrical form. For the purpose of preventing the rolls from being over heated by contact with the highly heated mass of iron under treatment, the rolls may be made hollow as indicated by dotted lines with a central water tube (o) extending down to near the bottom through which water is introduced, and which flows out around the tube, and is discharged at top.

I do not wish to confine myself to the special arrangement of mechanism herein described, as the principle or character of my invention may be variously modified. As for instance, instead of giving to the axis of the rolls the inclination indicated by the lines (l, l, l,) in Fig. 1, to draw down the iron, this may be effected by making the periphery of the rolls of a cam or eccentric form that when that portion of their circumference of least radius pass by the loop the mass may descend by gravity, or by making thread like or spiral projections on their peripheries.

Instead of making the lower end of the rolls alone adjustable both ends may be thus made, or the size of the space between their lower ends may be increased or descreased to determine the diameter of the bar to be produced by sliding the shafts endwise. Instead of giving motion to all the rollers, one or more may be driven to cause the ball or mass of iron under treatment to be rotated and squeezed. And if it be desired to produce a bar of iron of a tapered form instead of a cylindrical during the operation of rolling the mass the rollers can be caused to recede from or toward each other. And so of the other parts not necessary to be mentioned, but although the arrangement of machinery within the principle of my invention may be variously modified, I have given a full description and representation of that special arrangement which on experiment, I have found the most advantageous.

What I claim as my invention and desire to secure by Letters Patent, is—

1. The method of working puddlers' balls or other highly heated masses of iron and reducing them into bars by rolling and squeezing them gradually from one end and by surfaces whose motion or motions is at right angles or nearly so, to the axis of the bar to be produced, substantially as herein specified.

2. And I also claim as my invention in the machinery for the application of my improved method of working iron, the rolling and squeezing of balls or other highly heated masses of iron between surfaces inclined to the axes of the bar to be produced substantially as described, so that by the motion of one or more of the said surfaces at right angles or nearly so to the axis of the bar to be produced the mass of iron shall be gradually squeezed and reduced and carried toward and out of the space, between the said inclined surfaces where they are nearest together, the iron bar being thus delivered in the required form, substantially as described.

H. BURDEN.

Witnesses:
P. J. MILTON,
EPHR. MELT.